United States Patent [19]

Capion et al.

[11] Patent Number: 5,325,009
[45] Date of Patent: Jun. 28, 1994

[54] ROTOR SHAFT WITH INTEGRAL WEDGE RETAINERS FOR CORE OF A TWO-POLE GENERATOR

[75] Inventors: Robert L. Capion, Ridott; Lee L. Thomas, Rockford, both of Ill.

[73] Assignee: Sundstrand Corporation, Rockford, Ill.

[21] Appl. No.: 58,694

[22] Filed: May 7, 1993

[51] Int. Cl.⁵ .................................... H02K 1/22
[52] U.S. Cl. .................................... 310/261; 310/42; 310/91; 310/208; 310/216
[58] Field of Search ............... 310/261, 262, 216, 263, 310/264, 265, 42, 179, 180, 208, 91; 29/598

[56] References Cited

U.S. PATENT DOCUMENTS

| | | | |
|---|---|---|---|
| 3,656,017 | 4/1972 | Inagaki | 310/263 |
| 4,024,628 | 5/1977 | Crites | 310/262 |
| 4,510,679 | 4/1985 | Aleem et al. | 310/42 |
| 4,562,641 | 1/1986 | Mosher et al. | |
| 4,591,749 | 5/1986 | Gauthier et al. | |
| 4,598,218 | 7/1989 | Aleem et al. | |
| 4,614,888 | 9/1986 | Mosher et al. | 310/261 |
| 4,625,135 | 11/1986 | Kasabian | |
| 4,674,178 | 6/1987 | Patel | |
| 4,757,603 | 7/1988 | Stokes | 29/598 |

FOREIGN PATENT DOCUMENTS

| | | | |
|---|---|---|---|
| 2109617 | 12/1980 | Fed. Rep. of Germany | 310/263 |
| 0728395 | 7/1932 | France | 310/263 |
| 0969914 | 9/1964 | United Kingdom | 310/263 |
| 2016819 | 9/1979 | United Kingdom | 310/263 |
| 2232012 | 11/1990 | United Kingdom | 310/263 |

*Primary Examiner*—R. Skudy
*Attorney, Agent, or Firm*—Jeffery J. Makeever

[57] ABSTRACT

A two-pole generator rotor assembly (100) including a core (120) and a shaft for mounting the core (120). The shaft includes a pair of shaft end portions (117, 119), with each of the shaft end portions (117, 119) including an integrally formed axially extending retaining wedge portion (134) adapted to mount and retain the core (120) in the rotor assembly (100). The wedge retaining portions (134) include opposed surface portions arranged so as to define therebetween a slot for accommodating the core (120) when the shaft end portions (117, 119) are assembled so that the core (120) and shaft end portions (117, 119) form a rotor subassembly. An outer containment (114) is shrink fitted on the rotor subassembly. A tongue and groove connection (38a, 39) is provided between the respective retaining wedge portions (134) and associated shaft end portions (117, 119) so as to interlock the two end shaft portions (117, 119) together.

17 Claims, 2 Drawing Sheets

ROTOR SHAFT WITH INTEGRAL WEDGE RETAINERS FOR CORE OF A TWO-POLE GENERATOR

TECHNICAL FIELD

The present invention relates to a generator rotor and, more particularly, to a rotor shaft for a two-pole generator rotor used, for example, in integrated drive generators (IDG's), auxiliary power units (APU's), etc., for aircraft, with the rotor shaft including integrally formed wedge retainers for securing end shaft portions of the rotor shaft to a core of the rotor.

BACKGROUND ART

Generally two-pole generator rotors utilized in IDG's, APU's etc. are composed of a plurality of precision fitted parts which are bolted or welded together. While this technical approach is functionally satisfactory, a disadvantage of this approach resides in the fact that the total costs involved in producing the rotor as a result of the required precision fitting of the components as well as the necessary welding and bolting operations is relatively high. Conventionally, to accommodate a large number of turns in a field coil of a generator, wedge portions are provided which accommodate the field coil, with the wedges being generally hollowed out or configured to a coil profile which is somewhat rounded. This shaping requires complex parts for the retention of the end turns and high strength bolts are utilized to bolt shaft ends to the field coil pole piece and retain the separate field core accommodating wedges to the field pole pieces. Additionally, for a torque transmission, the oil accommodating canister surrounding the field coil is welded to the ends of the shaft after assembly and then finish ground to size.

A disadvantage of the conventional approach resides in the fact that the completed unit is, at best, difficult if not impossible to repair or service and, taking into account the manufacturing steps and processes, the unit is difficult and expensive to construct.

Furthermore, by virtue of the welding of the oil accommodating canister to the ends of the shafts, the conventional two-pole generator rotors are more or less somewhat disposable units since to repair or service such units, it is necessary to cut the welds so as to enable a removal of the oil accommodating canister which, as can readily be appreciated, is an expensive and time consuming process.

Typical examples of rotor constructions of the aforementioned type are disclosed in, for example, U.S. Pat. Nos. 4,510,679, 4,562,641, 4,591,749, 4,757,603, 4,674,178, 4,625,135, 4,590,218, 4,591,749, 4,598,218 and 4,614,888. While each of these patents provide various approaches for constructions of rotors and/or rotor assemblies, each of the technical approaches suffer from one or more of the above noted disadvantages encountered in the prior art.

More particularly, in U.S. Pat. No. 4,591,749 an arrangement is proposed for securing magnets to a shaft disposed beneath such magnets, with the shaft extending axially and protruding from each end of a magnetic portion of the assembly. This approach utilizes a plastic cage creating pockets or cavities for enabling an emplacement of a plurality of magnets, with a cover being staked to the end of the cage to retain the magnets in place.

In U.S. Pat. No. 4,625,135, an arrangement is provided for retaining magnets to a throughshaft by utilizing a shrink fit, with the functional significance lying in a provision of an arrangement for transferring the heat away from the magnets by utilizing a cast-in place aluminum heat sink which also functions to simplify installation of the magnets by providing pockets for accommodating such magnets.

The same is true with regard to U.S. Pat. No. 4,674,178 wherein several magnets are attached to a hub or shaft and retained in place by an encapsulation compound between the magnets and a fiber/resin matrix wrapped radially about the magnets. U.S. Pat. No. 4,757,603 proposes a sheet metal fabrication which spaces the individual magnets and retains the same with bent tabs, with the retention of the plurality of magnets being achieved by using an adhesive or a moldable matrix, and with the shaft being axially inserted through the assembly and retained by the molded matrix.

In aforementioned U.S. Pat. No. 4,562,218, a sleeve is joined by welding, with the ends of the shaft being welded to a canister, and wedges being provided and bolted to the core, with the end shafts also being bolted to the core.

While aforementioned U.S. Pat. No. 4,562,641 provides for a joining of end shafts to a rotor sleeve so as to achieve a rigid structure, the entire approach relates to a sequentially constructed rotor with the method of assembly of the end shafts being achieved by a plurality of fastening means such as bolts.

DISCLOSURE OF INVENTION

The aim underlying the present invention essentially resides in providing a two pole generator rotor assembly and, more particularly, a rotor shaft for a two-pole generator rotor assembly which avoids, by simple means, shortcomings and disadvantages encountered in the prior art and which is simple and inexpensive to manufacture.

In commonly assigned U.S. application Ser. No. 08/059,034, entitled "One-Piece Rotor Shaft For Two Pole Rotor", Mohammad Shahamat and Walter Iseman, filed on even date herewith, an effective technical approach is provided for avoiding the above mentioned shortcomings and disadvantages in the prior art by providing a two-pole generator rotor assembly which includes a prewound field coil assembly and a shaft means, with the shaft means including a pair of spaced apart shaft end portions and a substantially cylindrical portion integrally formed with the spaced end portions interposed therebetween so as to form a one-piece shaft. The substantially cylindrical central portion includes a through slot means for accommodating the prewound field coil assembly. The through slot means includes a pair of opposed wall portions and form wedge portions adapted to engage an outer peripheral portion of the prewound field coil assembly and form wedge portions.

In accordance with advantageous features of the present invention, a two pole generator rotor assembly is provided which includes a bipartite shaft having wedge means for a core assembly of the rotor respectively integrally formed with the shaft end portions, and with an oil containment canister, in the form of a sleeve member of high strength material, surrounding the assembled shaft unit.

In accordance with the present invention, the wedge means are formed as axially extended portions and, in an assembled condition of the shaft end portions, include opposed faces arranged so as to define therebetween a slot means for accommodating the core means whereby the core means and the shaft means form a rotor subassembly.

The sleeve member is preferably formed of, for example, Inconel and is shrink fitted on the rotor subassembly.

A prewound field coil winding is accommodated on the core means, with the opposed faces of the wedge means defining, with portions of the core means, a means for accommodating the field coil windings.

Each of the wedge means terminate in a free end portion, with the free end portion of the wedge means integrally formed with one of the shaft end portions being adapted to be brought into engagement with a portion of the other shaft end portion, and the free end portion of the wedge means integrally formed with the other of the shaft end portions being adapted to be brought into engagement with a portion of the first shaft end portion when the shaft end portions are assembled.

To provide rigidity and ensure a retention of the core assembly when the core assembly is subjected to centrifugal forces during rotation of the two-pole generator rotor assembly, at least the free end portions of the respective wedge means are provided with a means for connecting the respective wedge means to the associated shaft end portions.

The means for connecting may, in accordance with the present invention, include projection means provided on the free end portions for engagement with a corresponding notch means provided on the respective associated shaft end portions so as to enable a connection of the respective wedge means to the respective shaft end portions.

The respective shaft end portions in accordance with the present invention also include annular collars integrally formed with the shaft end portions and positioned between the ends of the respective shaft end portions and the respective wedge means, with the wedge means extending axially outwardly of the associated annular collars.

The opposed faces of the wedge means are provided with a means for mounting the field coil windings at the core means including a plurality of spaced axially extending flange means defining spaced slots for accommodating the field coil winding.

Additionally, coil winding end turn support means are provided at opposite axial ends of the core means and are disposed between the respective opposite axial ends and the respective annular collars of the shaft end portions.

To prevent an axial movement of the shaft end portions when the shaft end portions are assembled, advantageously, at least one locating pin means is provided which is adapted to be inserted in a direction substantially transverse to a longitudinal direction of the rotor subassembly.

The above and other objects, features and advantages of the present invention will become more apparent from the following description when taken in connection with the accompanying drawing which shows, for the purpose of illustration only, one embodiment in accordance with the present invention.

BEST MODE FOR CARRYING OUT THE INVENTION

Figure 1:
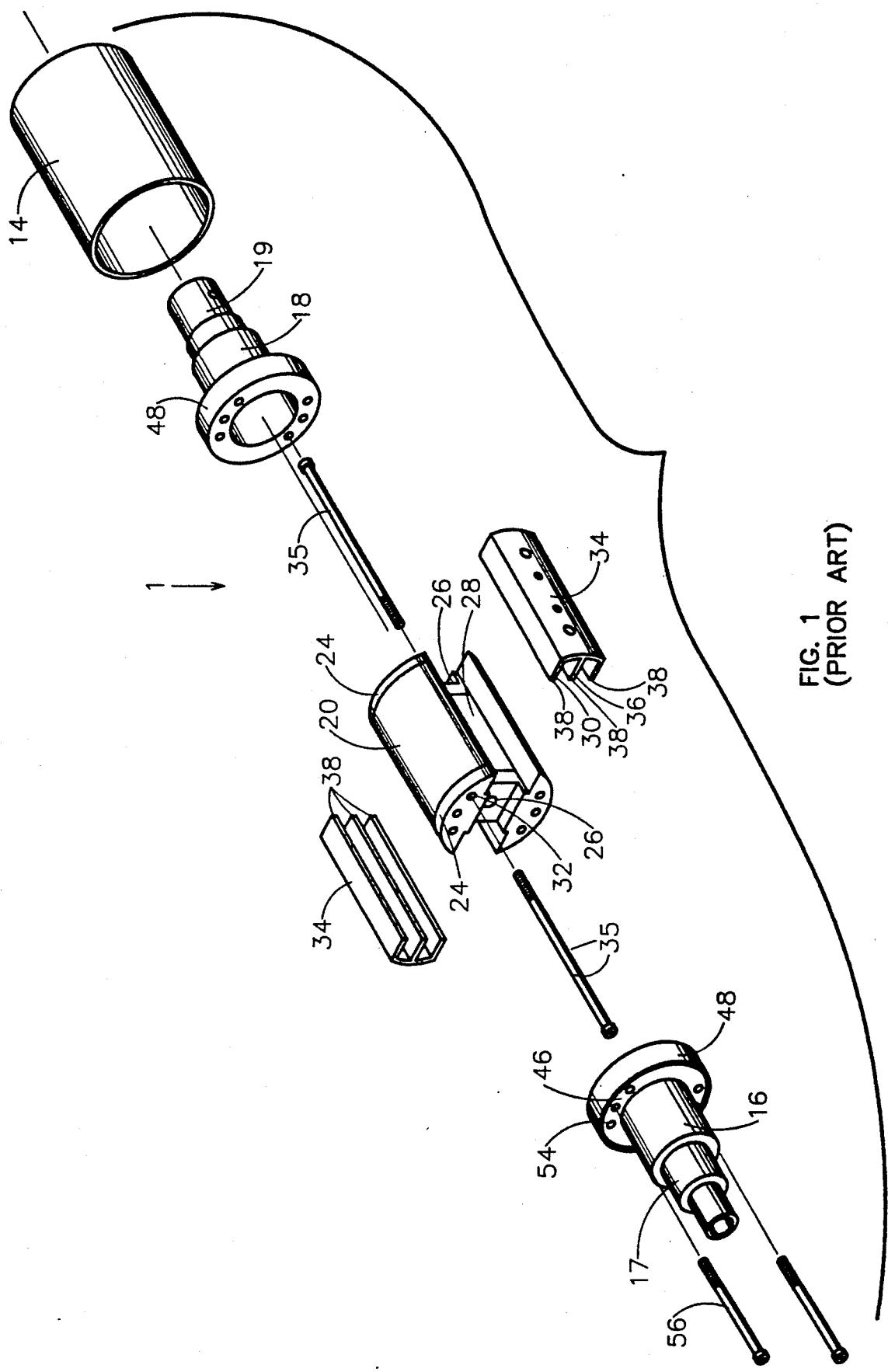
FIG. 1 is a schematic exploded perspective view of a conventional rotor assembly.

Referring now to the drawings wherein like reference numerals are used in both views to designate like parts and, more particularly, to FIG. 1, according to this figure, a conventional magnetic rotor assembly of the type disclosed, for example, in aforementioned U.S. Pat. No. 4,562,641, includes an I-shaped core 20 made from bonded lamination layers, with an end turn support 24 being provided at each axial end of the core 20 and configured to nominally match a cross-section of the core 20. The end turn supports 24 have axially oppositely opening rectangular recesses 26 which, with oppositely opening rectangular recesses 28 in the core 20 and end turn supports 24 provide a continuous undercut about the main core assembly for inclusion of the field winding.

A bore 32 is axially machined to close tolerances through each of the end supports 24 and the core 20 and threadably receives a bolt 35, with a single bolt 35 being inserted axially through each end turn support 24 at substantially diametrically opposing regions of the bore assembly.

M-shaped wedges 34 are closely mated in the core recesses 28 and have rectangular pathways 34 for the field windings defined by spaced axial flanges 38 of a length equal to a distance between opposed faces of the end turn supports 24.

The wedges 34 are assembled to the core 20 by suitable fasteners prior to a completion of a final machining of an outside diameter of the core 20. End shaft fittings 16, 18 are provided. Each end shaft fitting 16, 18 includes a circular cast base 46 of an integrally formed axially directed collar 48. The collars are concentric with the rotational axes of the shafts 17, 19 which are integral with and extend oppositely from the circular cast bases 46.

A second set of precision ground bolts 56 are threadably received in bores 54 and are tightenable to secure the end shaft fittings 16, 18 to the core subassembly, with the bolts 35, 56 positively maintaining the core 20, end turn supports 24 and end shaft fittings 16, 18 in an assembled relationship.

Following a final machining of the rotor assembly, the main field winding and completion of electrical connections, a sleeve 14 is placed over the completed assembly to provide a rigid structural member.

Figure 2:
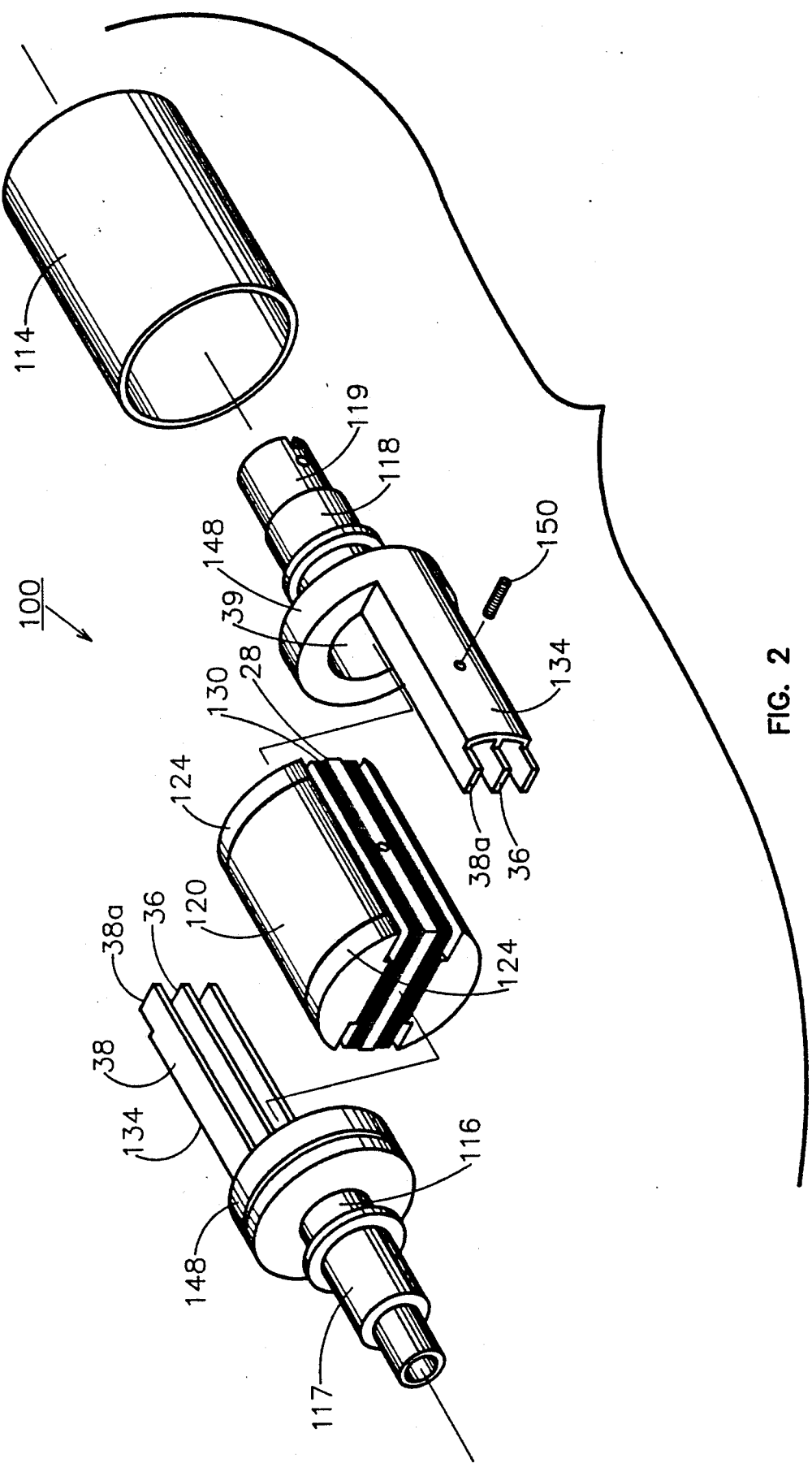
FIG. 2 is a schematic exploded view of a two-pole rotor assembly constructed in accordance with the present invention.

In accordance with the present invention, as shown most clearly in FIG. 2, a two-pole rotor includes a substantially I-shaped core 120 made from bonded lamination layers, with end turn supports 124 being provided at each axial end of the core 120 and being configured to nominally match the cross section of the core 120. The end turn supports 124 have axially opposite opening rectangular recesses (not shown) which, with oppositely opening rectangular recesses 28 in the core 120 provide a continuous undercut about the main core assembly for enabling an inclusion of a field winding 130.

A bipartite rotor shaft includes end shaft fittings 116, 118 and shaft end portions 117, 119, with each of the end fittings 116, 118 including an integrally formed axially directed collar 148. Each axially directed collar 148 includes an integrally formed wedge retaining portion 134 adapted to be closely mated in the core recesses 28. The wedge portions 134 have, along opposed surfaces thereof, substantially rectangular pathways 36 for the field windings 130, with the substantially rectangular pathways 36 being defined by spaced axial flanges 38. The spaced axial flanges 38 have a length such that free end portions thereof terminate in axially extending projections 38a which are adapted to be accommodated in corresponding slots 39 so as to form a tongue and groove connection between the respective wedge portions 134 and opposite shaft end portions 117, 119. Upon rotation of the rotor unit, centrifugal forces acting upon the wedge portions 134 tending to displace the same outwardly are prevented by virtue of the hooking or connecting of the wedge portions 134 in the slots 39 thereby forming a substantially rigid rotor subassembly including the main core 120, field core windings 130, end turn supports 124, and shaft end portions 117, 119. As apparent from FIG. 2, when the shaft end portions 117, 119 are assembled a slot is defined between the opposed faces of the wedge portions 134, with the so defined slot accommodating the core 120, field core windings 130, and end turn supports 124. To prevent an axial movement of the shaft end portions 117, 119 once assembled, means, such at least one locating pin means 150, is provided which is adapted to be inserted in a direction substantially transverse to a longitudinal direction of the rotor subassembly 100.

A cylindrical sleeve member 114, fashioned of a high strength material such as, for example, Inconel, surrounds the assembled main core 120 and defines, for example, an oil containment for the assembled rotor unit. The cylindrical sleeve member 114 is heated to, for example, 1100° F., and axially slid over the assembled main core 120 and assembled shaft components. The cylindrical sleeve member 114 is dimensioned such that the sleeve member 114 is shrink fitted on the assembled rotor unit thereby providing a rigid coupling of the shaft end portions 117, 119 as well as further holding the subassembly of the main core 120, field core windings 130, end turn supports 124, and shaft end portions 117, 119 together when the rotor unit is subjected to centrifugal forces.

The outer sleeve member 114 forms an outer containment for the assembled rotor unit and ensures the positioning of the main core subassembly without the need of a welding operation for securing the shaft end portions 117, 119 together and also eliminates the need for any type of fasteners, adhesives, moldable matrices, or the staking or upsetting of any of the components.

The wedges portions 134 may be configured so as to accommodate not only prewound field windings having a specific outer profile but also prewound coils having a flat surface on a coil facing side of the respective wedges 134.

While we have shown and described only one embodiment in accordance with the present invention, it is understood that the same is not limited thereto but is susceptible to numerous changes and modifications as known to one of ordinary skill in the art, and we therefore do not wish to be limited to the details shown and described herein, but intend to cover all such modifications as are encompassed by the scope of the appended claims.

I claim:

1. A two-pole generator rotor assembly comprising core means, and a shaft means for mounting said core means, said shaft means including a first and a second shaft end portion, each of said shaft end portions including an integrally formed axially extending wedge means adapted to mount the core means in the rotor assembly, and wherein said wedge means include opposed faces arranged so as to define therebetween a slot means for accommodating said core means when said shaft end portions are assembled whereby said core means and said shaft means form a rotor subassembly, and wherein means are provided on at least free end portions of the wedge means for connection the wedge means to the shaft end portions 2. A two-pole generator rotor assembly according to claim 1, wherein means surrounding the rotor subassembly form an outer containment thereof.

3. A two-pole generator rotor assembly according to claim 2, wherein, said means surrounding includes a substantially cylindrical sleeve of a high strength material axially slidable over the rotor subassembly.

4. A two-pole generator rotor assembly according to claim 3, wherein said sleeve is shrink fitted on said rotor subassembly.

5. A two-pole generator rotor assembly according to claim 4, wherein a plurality of prewound field coil windings are accommodated on said core means, and wherein said opposed faces define with portions of said core means a means accommodating the plurality of prewound field coil windings.

6. A two-pole generator rotor assembly according to claim 5, wherein each of said wedge means terminate in a free end portion, the free end portion of the wedge means integrally formed with said first shaft end portion being adapted to be brought into engagement with a portion of the second shaft end portion, and the free end portion of the wedge means integrally formed with said second shaft end portion being adapted to be brought into engagement with a portion of said first shaft end portion when said first and said second shaft end portions are assembled.

7. A two-pole generator rotor assembly according to claim 1, wherein a plurality of prewound field coil windings are accommodated on said core means, and wherein said opposed faces define with portions of said core means, a means accommodating the plurality of field coil windings.

8. A two-pole generator rotor assembly according to claim 7, wherein each of said wedge terminate in a free end portion, the free end portion of the wedge means integrally formed with said first shaft end portion being adapted to be brought into engagement with a portion of the second shaft end portion, and the free end portion of the wedge means integrally formed with said second shaft end portion being adapted to be brought into engagement with a portion of said first shaft end portion when said first and said second shaft end portions are assembled.

9. A two-pole generator rotor assembly according to claim 1, wherein said wedge means integrally formed on the first shaft end portion includes means for connecting a free end portion thereof to the second shaft end portion, and wherein said wedge means integrally formed on the second shaft end portion includes means for connecting a free end portion thereof to the first shaft end portion so as to interlock the first and the second shaft end portions together.

10. A two-pole generator rotor assembly according to claim 9, wherein said means for connecting the first and the second shaft end portions together includes a tongue and groove connection between the wedge means of the first shaft end portion and the second shaft end portion, and between the wedge means of the second shaft end portion and the first shaft end portion.

11. A two-pole generator rotor assembly comprising core means, and a shaft means for mounting said core means, said shaft means including a first and a second shaft end portion, each of said shaft end portions including an integrally formed axially extending wedge means adapted to mount the core means in the rotor assembly, and wherein said wedge means include opposed faces arranged so as to define therebetween a slot means for accommodating said core means when said shaft end portions are assembled whereby said core means and said shaft means form a rotor subassembly, and wherein means surrounding the rotor subassembly form an outer containment thereof, and wherein said means surrounding includes a substantially cylindrical sleeve of a high strength material axially slidable over the rotor subassembly, and wherein said sleeve is shrink fitted on said rotor subassembly, and wherein a prewound field coil winding is accommodated on said core means, and wherein said opposed faces define with portions of said core means a means accommodating a plurality of field coil windings, and wherein each of said wedge means terminate in a free end portion, the free end portion of the wedge means integrally formed with said first shaft end portion being adapted to be brought into engagement with a portion of the second shaft end portion, and the free end portion of the wedge means integrally formed with said second shaft end portion being adapted to be brought into engagement with a portion of said first shaft end portion when said first and said second shaft end portions are assembled, and wherein means are provided on at least said free end portions of the wedge means for connecting the wedge means to the shaft end portions, and wherein said means for connecting the wedge means to the shaft end portions includes axially extending projection means provided on said free end portions for engagement with corresponding notch means provided on the shaft end portions to connect the wedge means to the shaft end portions.

12. A two-pole generator rotor assembly according to claim 11, wherein said shaft end portions engageable with the free end portions of the wedge means include annular collars integrally formed with the shaft end portions.

13. A two-pole generator rotor assembly according to claim 12, wherein means are provided on each of said opposed faces of said wedge means for mounting said field coil winding at said core means.

14. A two-pole generator rotor assembly according to claim 13, wherein said means for mounting includes a plurality of spaced axially extending flange means defining spaced slots for accommodating the field coil winding.

15. A two-pole generator rotor assembly according to claim 14, wherein coil winding end turn support means are provided at opposite axial ends of the core means and are disposed between the opposite axial ends and one of the annular collars of the shaft end portions.

16. A two-pole generator rotor assembly according to claim 15, wherein means are provided for preventing axial movement of the shaft end portions when the shaft end portions are assembled.

17. A two-pole generator rotor assembly according to claim 16, wherein said means for preventing axial movement includes at least one locating pin means adapted to be inserted in a direction substantially transverse to a longitudinal direction of the rotor subassembly.

* * * * *